July 26, 1938.   N. WIENER ET AL   2,124,599
ELECTRICAL NETWORK SYSTEM
Filed July 18, 1936    6 Sheets-Sheet 1

INVENTORS
Norbert Wiener
Yuk-Wing Lee

INVENTORS
Norbert Wiener
Yuk-Wing Lee

The numbers on the final filters refer to the pass bands in Fig. 24.

Fig. 23

July 26, 1938.　　　N. WIENER ET AL　　　2,124,599
ELECTRICAL NETWORK SYSTEM
Filed July 18, 1936　　　6 Sheets-Sheet 6

INVENTORS
Norbert Wiener
Yuk-Wing Lee

Patented July 26, 1938

2,124,599

UNITED STATES PATENT OFFICE 2,124,599

ELECTRICAL NETWORK SYSTEM

Norbert Wiener and Yuk-Wing Lee, Peiping, China, assignors to American Telephone and Telegraph Company, a corporation of New York Application July 18, 1936, Serial No. 91,360

15 Claims. (Cl. 178—44)

This invention relates to wave transmission networks and more particularly to networks which pass one or more regions of the frequency spectrum with substantially uniform attenuation while subjecting other regions to very great relative attenuations. It has as its principal object the improvement in the art of constructing such networks as will divide the frequency spectrum into a large number of regions and will furnish a large number of output circuits in each of which one of these regions will be transmitted with small and substantially constant attenuation while other regions will be greatly attenuated.

It has as a further object the improvement of the art of separating each of a plurality of input electromotive forces or currents from its side bands, and of combining the electromotive forces or currents thus separated into a single current which may be transmitted for communication purposes over a single circuit. It has as a further object the attainment of these ends by a structure which contains only a small number of kinds and sizes of element repeated a great number of times, and thus lends itself to methods of mass manufacture. It has as a further object the construction of a filter with a plurality of outputs or of inputs, and of excellent linearity of phase shift, which is made possible together with an economy of parts by the fact that the phase shift of each output or from each input is determined by a network structure common to all.

These objects are achieved in accordance with the invention by constructing the network in the form of a cascade of networks, each with a multiplicity of outputs, such that the first member of the cascade separates the frequency spectrum into a number of regions, several of which are transmitted with low attenuation in each output of the first member, while the later members of the cascade complete the isolation of these regions. They are further achieved by the construction of the component networks of the cascade or of certain of them as themselves cascades of identical phase shifting networks, together with means of combining outputs taken from between the stages of such cascades into sums having desired attenuation with respect to the original input. In case the device is used for the suppression of side bands, the roles of the inputs and the outputs are interchanged, and the cascade structure is reversed in order. The structure remains the same, except that all amplifiers are reversed in sense. Throughout this specification, this reversal is to be understood as included in our description, wherever it is appropriate.

In the component cascades of phase shifting networks, a considerable economy is obtained by the use of an open circuit termination to produce a reflection, and thus to substantially double the length of the cascade. While only open circuit reflection will be discussed in the examples fully described in the present specification, the inventors are fully aware of the possibility of producing analogous results by short circuit reflection and other modes of reflection, and have included these other forms of reflection in their claims.

Other objects and structural details of this invention will be apparent from the following description, when read in connection with the accompanying figures, wherein.

Figures 1, 2, 3, 4:
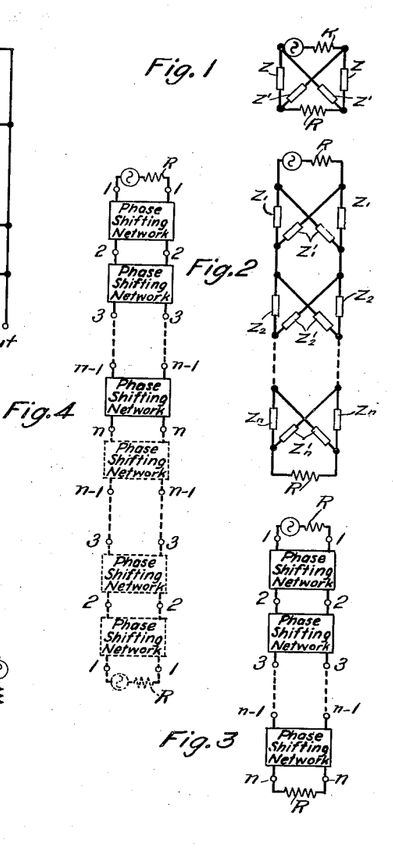
Figures 1, 2 and 3 are illustrative of network elements used in the invention.
Figure 4 shows a network configuration basic to the invention.

Figure 1 represents a lattice structure comprising two equal line impedances Z and two equal impedances Z' connected diagonally between the input and the output terminals. We suppose both Z and Z' to be pure imaginaries— that is, the impedances are reactive. We also suppose that the pure resistance R is a mean proportional between Z and Z'. This structure represents one form that certain important elements of the system of the invention may take. The resistance R represents the terminal load of the lattice, and also the load out of which the lattice works. The impedance of the lattice plus terminal load will also be R. The absolute voltage ratio of the lattice viewed as a four terminal network will be unity, and the angle of phase shift generated by the lattice will be $$\theta = 2\,\tan^{-1} j\frac{Z}{R}. \quad (1)$$

Figure 2 represents a cascade of lattices such as those of Figure 1. We shall again assume that the branch impedances are all reactive, and that the mean proportional of the line impedances and the corresponding lattice impedances is the same constant resistance R for each section. The structure of Figure 2 will again have absolute voltage ratio unity when terminated by a resistance R, while its angle of phase shift will be $$\theta = \sum_{k=1}^{n} 2\,\tan^{-1} j\frac{Z_k}{R}. \quad (2)$$

In the above equation and in those that follow, $n$ denotes the number of junction points or terminal pairs in the sectionalized line, the number of sections being $n-1$, and $k$ denotes the numerical order in the sequence of any given line section or its input terminals.

Figure 3 represents a cascade of identical four terminal networks such as those of Figure 1 or Figure 2, all with absolute voltage ratio unity, image resistance R, and phase shift angle $\theta$, where $\theta$ is a function of the frequency $f$. If the complex voltage across terminals 1 is $v$, the complex voltage across terminals 2 will be $ve^{j\theta}$, and across terminals $n$ will be $ve^{(n-1)j\theta}$.

Figure 4 represents a cascade such as that of Figure 3, but differing from that of Figure 3 in that while the cascade leads out of a resistance R, it leads into an open circuit. The dotted lines indicate the reflection of the structure of Figure 4 in the point where the circuit is open, and together with the full lines indicate an equivalent structure of twice the number of meshes and terminated by a resistance. If the voltage across the terminals of the generator is $v$, the voltage across terminals 1 will be the sum of that due to the actual generator of the figure and the image generator, and will be $$\frac{v}{2}(1 + e^{(2n-2)j\theta}). \quad (3)$$

The voltage across terminals 2 will be $$\frac{v}{2}(e^{j\theta} + e^{(2n-3)j\theta}), \quad (4)$$

and the voltage across the remaining terminals may be determined similarly, that across terminals $n$ being $$ve^{j(n-1)\theta}. \quad (5)$$

Let us represent this voltage by $w$. It differs only by a phase shift of $(n-1)\theta$ from $v$. The voltage across terminals $k$, in our system of numeration, will be $$w\cos(n-k)\theta. \quad (6)$$

Thus if we provide means: (a) of multiplying the voltages (6) by real factors, which may be positive or negative; and (b) of adding these products; we shall be able to produce a four-terminal network with a phase shift of $(n-1)\theta$ and a voltage ratio of $$\sum_{0}^{n-1} a_k \cos k\theta. \quad (7)$$

Figure 5:
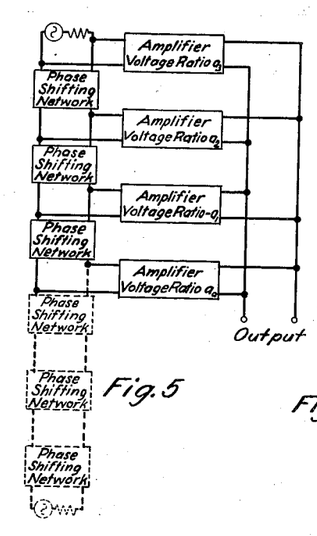
Figures 5, 6 and 7 represent different embodiments of the invention.
Figure 6:
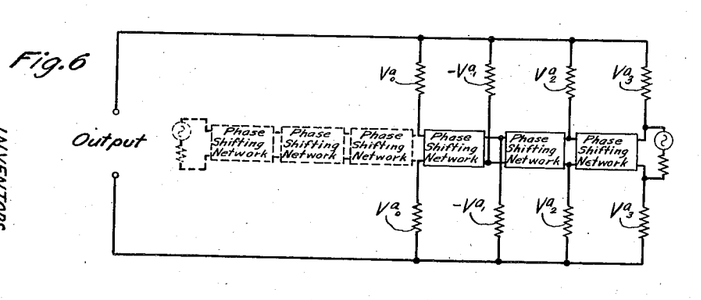
Figure 7:
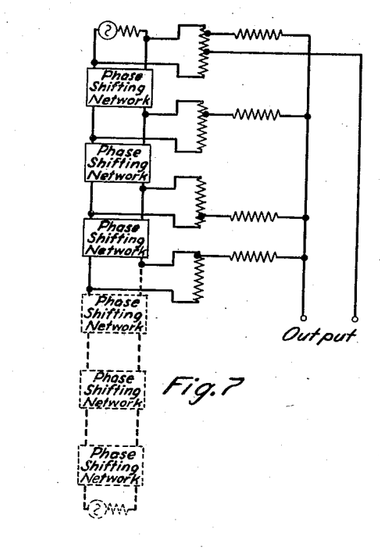

There are various practicable methods of producing the necessary multiplications and phase shifts by high resistance leads, vacuum tubes, etc. Figure 5 represents one method of achieving this end by the use of vacuum tubes with adjustable gain. In this structure $na_k$ is the voltage ratio of the $k$th amplifier from the end more remote from the input, the voltage ratio of the terminal amplifier being $na_0$. A reversal of the output terminals or the input terminals of the amplifier is considered equivalent to a change in sign in the voltage ratio. Figure 6 indicates a method of achieving the same result by the use of high resistance leads inversely proportional in resistance to the constants $a_k$. Figure 7 indicates yet another method in which high resistance potentiometers are used to determine the $a_k$'s, and in which one output terminal is connected to the middlepoint of the potentiometers, while the other output terminal is connected by leads of extremely high and equal resistance to the points on the several potentiometers determined by the $a_k$'s.

Figure 8:
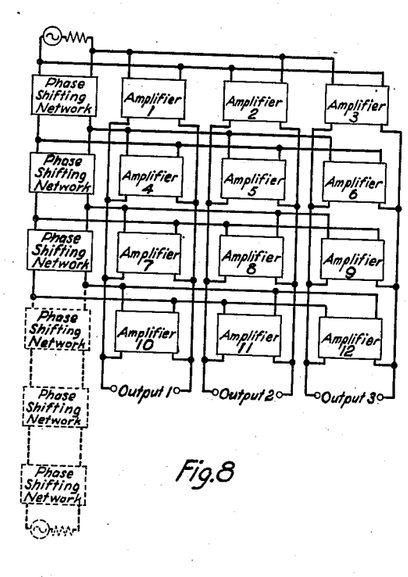
Figures 8 and 10 show two embodiments of a modified form of the invention.

It will be seen that all these methods of connecting the output terminals to the main structure of a cascade of phase shifting networks do not affect to any great degree the characteristics of this cascade, as they lead actually or approximately into open circuit. There is thus no difficulty in principle in connecting the same main structure to as many output circuits as may be desired, each output circuit having an independent attenuation characteristic with respect to the input, although they share the same phase characteristic, apart from possible abrupt changes of 180° in phase where the attenuation characteristic is infinite. This use of multiple outputs is illustrated in Figure 8. In this figure amplifiers 1 to 12, inclusive, are connected at their input terminals in groups of three to the junction points of the line sections and at their output terminals in groups of four to the ultimate terminals designated output 1, output 2, and output 3. The arrangement is such that each of the three outputs receives oscillations from each of the four junction points in the line appropriately modified by the respective amplifier gains. The disadvantage of such an arrangement is that if is carried out with the aid of amplifiers, the number of amplifiers is likely to be somewhat excessive, while if high resistance leads are used, the parallel connection of a large number tends to decrease their resistance unduly and to make it possible to treat this resistance as infinite to a first approximation. It is desirable in using such a network with multiple outputs to restrict the number of outputs as far as possible. Figure 8 is to be read in connection with the following tables.

Voltage ratio of amplifier $1 = a_3$
Voltage ratio of amplifier $2 = -b_3$
Voltage ratio of amplifier $3 = c_3$
Voltage ratio of amplifier $4 = a_2$
Voltage ratio of amplifier $5 = b_2$
Voltage ratio of amplifier $6 = c_2$
Voltage ratio of amplifier $7 = a_1$
Voltage ratio of amplifier $8 = -b_1$
Voltage ratio of amplifier $9 = c_1$
Voltage ratio of amplifier $10 = a_0$
Voltage ratio of amplifier $11 = -b_0$
Voltage ratio of amplifier $12 = -c_0$

*Voltage ratio of output 1*

$$\frac{1}{2}(a_0 + a_1 \cos\theta + a_2 \cos 2\theta + a_3 \cos 3\theta)$$

*Voltage ratio of output 2*

$$-\frac{1}{2}(b_0 + b_1 \cos\theta - b_2 \cos 2\theta + b_3 \cos 3\theta)$$

*Voltage ratio of output 3*

$$\frac{1}{2}(-c_0 + c_1 \cos\theta + c_2 \cos 2\theta + c_3 \cos 3\theta)$$

Figure 9:
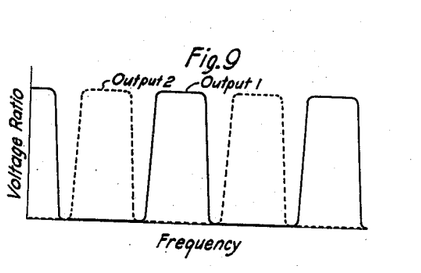
Figure 9 is illustrative of the characteristics of the systems of Figures 8 and 10.

One of the main uses for a network with a multiplicity of outputs is as a bank of wave filters, to split a given range of frequencies into several approximately equal ranges, and to deliver to each output circuit one and substantially only one of these ranges with substantially uniform small attenuation. This may be done in two or more stages, the first stage being the separation of the frequency band as by a pair of complementary multiple band pass filters into two parts as illustrated in Figure 9, each part consisting in a succession of approximately equal bands separated by approximately equal intervals. The second stage and the later stages of filtering (if any) will be devoted to the suppression in each output of all but one of the bands passed. This suppression does not demand an attenuation characteristic which changes rapidly in a narrow interval of frequency, and may thus be attained by a secondary filter of simple and inexpensive construction. Accordingly, the original stage of filtering will only have two separate outputs, thus greatly economizing in the use of amplifiers. A further economy results from the fact that the phase shifting networks between outputs are designed to produce approximately linear shifts of a large number of complete revolutions, so that substantially the same attenuation pattern shall be repeated many times in the frequency scale. This means that the leads to amplifiers are located at infrequent intervals along the lattice structure, which again reduces the number of amplifiers.

If only two outputs are desired, and these complementary, the Fourier series for the two will have respective forms $$a_0 + a_1 \cos\theta + a_2 \cos 2\theta + \ldots + a_n \cos n\theta \quad (8)$$

and $$a_0 - a_1 \cos\theta + a_2 \cos 2\theta - \ldots \pm a_n \cos n\theta \quad (9)$$

Figure 10:
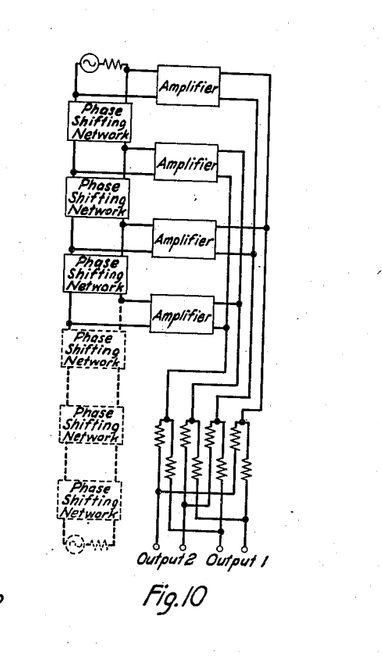

This suggests that the odd and the even amplifiers may be connected by resistance leads which will respectively add and subtract their outputs. This connection is illustrated in Figure 10. It is of course understood that the impedance across output terminals 1 is the same as that across output terminals 2. We shall assume the resistance looking backward into either of these pairs of terminals to be equal to the image resistance of our unit phase shifting network. This becomes important when the outputs are connected to the inputs of subsequent similar filtering devices as described later in connection with Figure 23.

The problem of designing a network such as that of Figure 10, as the first stage of a multiple output filter, may be divided into two parts. In the first, we express the characteristic of the outputs in terms of $\theta$, the phase shift or phase constant of the networks lying between amplifier connections, and in the second, we discuss these phase shifting networks, and $\theta$ as a function of the frequency $f$. In the first stage we shall assume that $\theta$ is to be roughly proportional to $f$, which is one of the results we secure in the second stage in design. The mathematical problem of the first stage is accordingly: to find a polynomial (8) which shall be nearly equal to 1 over $0 \leq \theta \leq \theta_1$, where $\theta_1 < 90°$, and which shall be small over $90° \leq \theta \leq 180°$. Over the intermediate region $\theta_1 < \theta < 90°$, the behavior of (8) is not held to any very strict requirements, except that it is desirable that it shall not exceed 1 in modulus. It will be seen that there are several quantities which should simultaneously be kept small. These are: (a) $n$, the order of the polynomial (8); (b) $90° - \theta_1$, the width of the transition band; (c) the upper bound of the modulus of (8) over $(90°, 180°)$; (d) the upper bound of the difference between (8) and 1 over $(0°, \theta_1)$. The relative weight to be given to these several quantities is impossible to determine in advance, and accordingly we shall not attempt any purely mathematical minimization of these four quantities, but shall be content with a method of determining $n$ and the $a_k$'s which has worked very well in practice. It has the advantage over several other methods which we have tried that the computation is not unduly tedious. It depends on giving to the polynomial (8) assigned values 1 at equally spaced points in the desired pass band and values 0 at equally spaced points in the attenuation band, and on choosing the values in an intermediate transition band in such a manner as to make (8) as smooth as possible in points remote from the transition band. It is thus a method of trigonometrical interpolation. The results of this interpolation are quite good as they stand but a little experimental manipulation may subsequently be used to reduce some of the remaining irregularities.

In the process of interpolation the following trigonometrical identities are made use of. These identities may be proved by standard mathematical processes.

The function which results from trigonometrical interpolation between the value 1 at $\theta = 0$ and the value 0 at $\theta = k\pi/n$ ($0 < k \leq n$) is $$\frac{1}{n}\left(\frac{1}{2} + \cos\theta + \cos 2\theta + \ldots + \cos(n-1)\theta + \frac{1}{2}\cos n\theta\right) = \frac{1}{2n}\sin n\theta \cot\frac{\theta}{2} = \frac{\sin n\theta}{n\theta} + \frac{1}{n}O(\theta), \quad (10)$$

where $O(\theta)$ does not exceed in absolute value a constant multiple of $\theta$.

The function $$\varphi(\theta) = a_0 \frac{\sin n\theta}{n\theta} + a_1 \frac{\sin n\left(\theta - \frac{\pi}{n}\right)}{n\left(\theta - \frac{\pi}{n}\right)} + a_2 \frac{\sin n\left(\theta - \frac{2\pi}{n}\right)}{n\left(\theta - \frac{2\pi}{n}\right)} + \ldots + a_k \frac{\sin n\left(\theta - \frac{k\pi}{n}\right)}{n\left(\theta - \frac{k\pi}{n}\right)} =$$

$$\frac{\sin n\theta}{n}\left(\frac{a_0}{\theta} - \frac{a_1}{\theta - \frac{\pi}{n}} + \frac{a_2}{\theta - \frac{2\pi}{n}} - \ldots \pm \frac{a_k}{\theta - \frac{k\pi}{n}}\right) \quad (11)$$

vanishes for $$\theta = \frac{\nu\pi}{n}$$

where $$\nu \neq 0, \nu \pm 1, \ldots, \nu \pm k.$$

At the point $$\theta = \frac{\nu\pi}{n} \quad (0 \leq \nu \leq k)$$

it equals $a_\nu$. We wish to determine the sequence of values of $a_\nu$ which will minimize the order of $\varphi(\theta)$ for large values of $\theta$. It is easy to show that $$\frac{1}{\theta}-\frac{1}{\theta-\frac{\pi}{n}}=\frac{-\frac{\pi}{n}}{\theta\left(\theta-\frac{\pi}{n}\right)};$$

$$\frac{1}{\theta}-\frac{2}{\theta-\frac{\pi}{n}}+\frac{1}{\theta-\frac{2\pi}{n}}=\frac{2!\frac{\pi^2}{n^2}}{\theta\left(\theta-\frac{\pi}{n}\right)\left(\theta-\frac{2\pi}{n}\right)};$$

$$\frac{1}{\theta}-\frac{3}{\theta-\frac{\pi}{n}}+\frac{3}{\theta-\frac{2\pi}{n}}-\frac{1}{\theta-\frac{3\pi}{n}}=$$

$$\frac{-3!\frac{\pi^3}{n^3}}{\theta\left(\theta-\frac{\pi}{n}\right)\left(\theta-\frac{2\pi}{n}\right)\left(\theta-\frac{3\pi}{n}\right)}. \quad (12)$$

It thus suggests itself that $$\frac{1}{\theta}-\frac{m}{\theta-\frac{\pi}{n}}+\frac{\frac{m(m-1)}{2!}}{\theta-\frac{2\pi}{n}}-\cdots\pm$$

$$\frac{1}{\theta-\frac{m\pi}{n}}=\frac{\left(-\frac{\pi}{n}\right)^m m!}{\theta\left(\theta-\frac{\pi}{n}\right)\cdots\left(\theta-\frac{m\pi}{n}\right)}. \quad (13)$$

It is not difficult to establish this by mathematical induction. Thus the partial fraction expansion (13) is as small in order as possible for great values of $\theta$, and it becomes reasonable to put $$a_0=1, \ a_1=m, \ a_2=\frac{m(m-1)}{2!}; \ \ldots, \ a_m=1 \quad (14)$$

if we are looking for a function which will be large in one region and relatively as small as possible away from that region. As we have seen, this function may be very accurately represented by a trigonometrical polynomial.

If we take such a polynomial, and replace $\theta$ by $$\theta-\frac{\pi}{n},$$

we merely displace the peak. If we add a large number of such polynomials in which the peaks have been successively displaced by $$\frac{\pi}{n}, \frac{2\pi}{n}, \ldots,$$

we obtain a function which is nearly a constant over one region, nearly zero over another, and which assumes intermediate values over two transition bands. It may be obtained by trigonometrical interpolation between values which are 0 over equally spaced points in the attenuation region, and then proceeds through the successive values $$2^{-m}, (1+m)2^{-m},$$

$$\left(1+m+\frac{m(m-1)}{2}\right)2^{-m}, \ldots, 1, \quad (15)$$

thereafter remaining 1 until the next transition region is reached, where the same values are assumed in the opposite sequence. Such transition sequences of values run:

0, 1;
0, ½, 1;
0, ¼, ¾, 1;
0, ⅛, ½, ⅞, 1;
0, 1/16, 5/16, 11/16, 15/16, 1;
0, 1/32, 3/16, ½, 13/16, 31/32, 1;
------------------------------(16)

Thus if we wish to obtain a trigonometric polynomial of given degree which is to be very close to 1 over one range and very close to 0 over another, we may use trigonometric interpolation with these transitional values. As an example, let us interpolate between the values

| Angle | 0° | 15° | 30° | 45° | 60° | 75° | 90° | 105° | 120° | 135° | 165° | 180° |
|---|---|---|---|---|---|---|---|---|---|---|---|---|
| Function | 1 | 1 | 1 | 1 | .75 | .25 | 0 | 0 | 0 | 0 | 0 | 0 |

(17)

Here 60° and 75° are transitional values. We obtain as our interpolation function $.375+.5798 \cos \theta+.21242 \cos 2\theta-.07113 \cos 3\theta$
$-.125 \cos 4\theta-.03297 \cos 5\theta+.04167 \cos 6\theta$
$+.03596 \cos 7\theta-.0122 \cos 9\theta-.00409 \cos 10\theta$
$+.00055 \cos 11\theta.$ (18)

Figure 11:
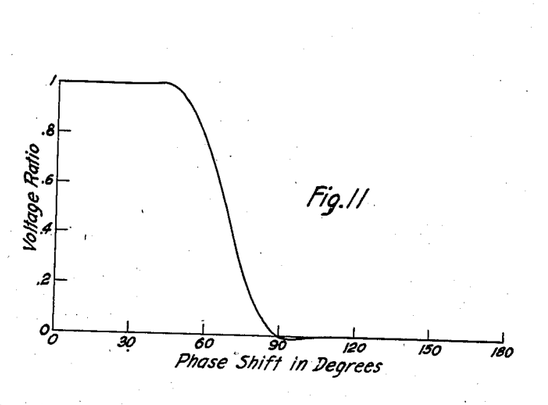
Figures 11, 12 and 13 represent typical selectivity characteristics obtainable by means of the invention.
Figure 12:
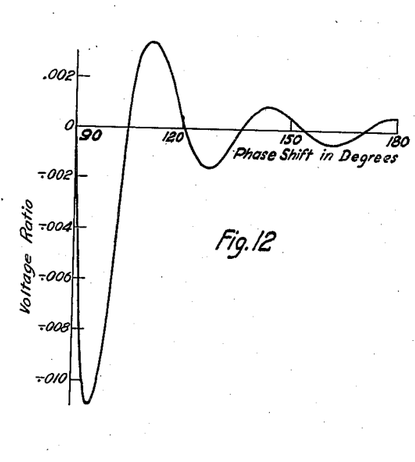

The graph of this is shown in Figure 11. An enlarged view of the portion of this graph between 90° and 180° is shown in Figure 12. It will be seen that this graph has one rather large peak after 90°. By a little experimenting, this may be removed, and if we replace (18) by $.37595+.57980 \cos \theta+.21032 \cos 2\theta-.07113 \cos 3\theta-.12290 \cos 4\theta-.03297 \cos 5\theta+.03957 \cos 6\theta+.03596 \cos 7\theta+.00210 \cos 8\theta-.01220 \cos 9\theta-.00514 \cos 10\theta,$ (19)

Figure 13:
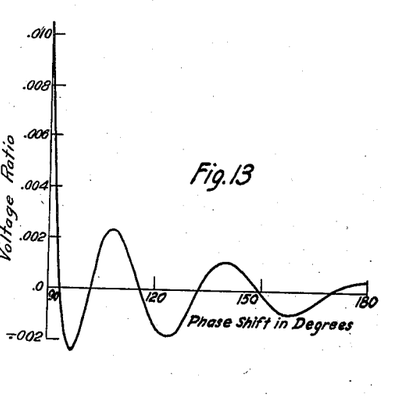

Figure 12 is replaced by Figure 13.

Figures 18, 19, 20, 21, 22:
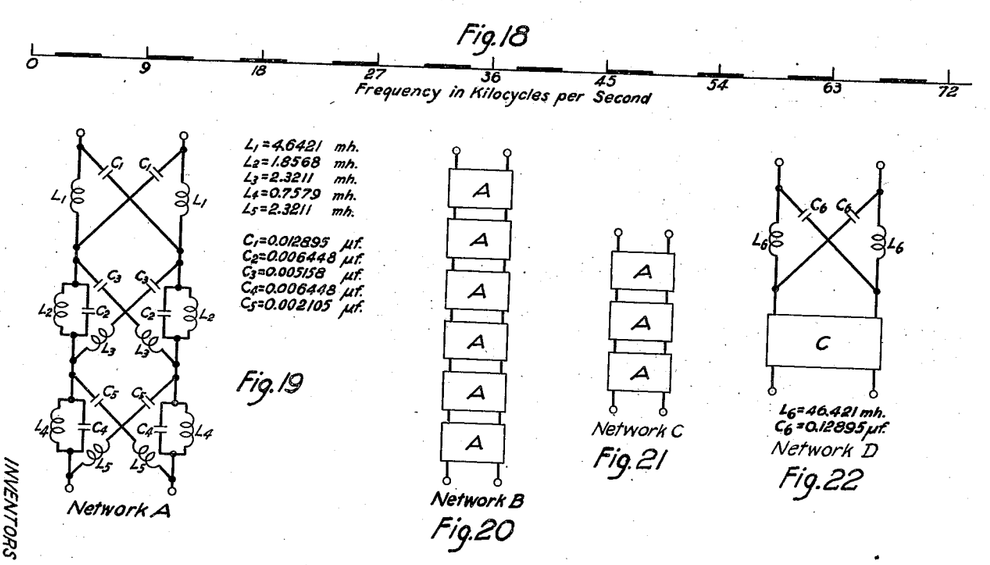
Figures 19, 20, 21 and 22 are illustrative of particular phase shifting networks used in the systems of the invention.

The second stage of the design of our invention consists in the design of phase shifting networks which shall give a substantially linear phase shift over a wide band of frequencies. There are many structures available for this purpose in the art, and we make no claim for originality in this respect. U. S. Patent No. 1,828,454 issued to Bode Oct. 20, 1931 discloses such a structure on page 8, and U. S. Patent No. 1,792,523 issued to Zobel Feb. 17, 1931 give examples of such structures. Figure 19 illustrates a form of phase shifting network used in one realization of our invention. The magnitudes of the various inductances and capacities are indicated in the chart accompanying the diagram.

Figure 14:
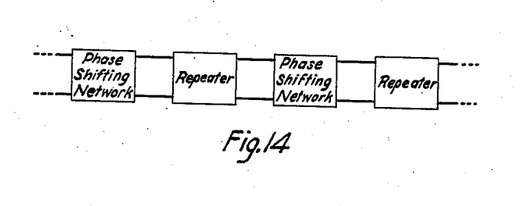
Figures 14 and 15 illustrate the use of repeaters in the systems of the invention.
Figure 15:
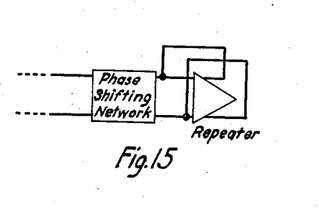

In general, in any electrical network design, there are two stages: (1) the design made under the assumption that the elements are pure resistances, inductances, and capacities, with values precisely assignable at will; and (2) the modifications made in order to take account of parasitic resistances and leakages and of other imperfections of the elements, together with the changes in design conditioned by the fact that very close tolerances are economically impracticable. The methods used in overcoming these difficulties are much the same for all classes of network. A pure phase shifting network which is modified by giving to each inductance a parasitic resistance in series and to each capacitance a parasitic leakage in parallel, and in which the ratio of each inductance to its accompanying resistance is the same as the ratio of each capacitance to its accompanying leakance, has the same phase shifting characteristic as the corresponding network of pure reactances, and a fixed but non-zero attenuation. For this, see Bode, U. S. Patent 1,828,454 issued Oct. 20, 1931, p. 8, lines 78–91. The attenuation of such a network may be cancelled by the use of repeater elements of low gain. One arrangement of such elements is shown in Figure 14. It is not thereby intended to restrict our invention to any particular arrangement of such elements. A terminal repeater element may be used to eliminate the losses in the final phase shifting element upon reflection. One of the many possible connections of said repeater element is shown in Figure 15.

Figure 16:
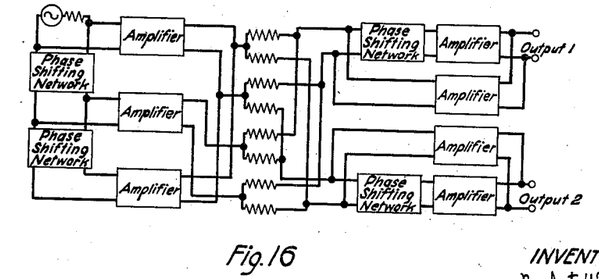
Figure 16 shows a second modified form of the invention.

It is well known in the art that a practicable method of avoiding the need for excessively close tolerances in the construction of a network is to realize this as a cascade of subordinate networks. This method is at our disposal here as well. Figure 10 represents one embodiment of our invention in a single structure, and Figure 16 represents an equivalent embodiment of our invention as a cascade of simple structures. While the circuit shown in Figure 16 includes more elementary line sections than that shown in Figure 10, and, therefore, requires the use of a larger number of capacities and inductances, the permissible manufacturing tolerances in the elements is greater and the increased number is offset by lower individual costs. The setting and structure of Figure 16 are obtained as follows: (1) the voltage ratio $$P(\theta) = a_0 + a_1 \cos\theta + \ldots + a_n \cos n\theta \quad (20)$$

is plotted against $\theta$; (2) the real zeros $\alpha_1, \ldots, \alpha_m$ of (20) are determined; (3) the polynominal $$Q(\theta) = \prod_1^m (\cos\theta - \cos\alpha_k) \quad (21)$$

is expanded; (4) the polynominal $P(\theta)/Q(\theta)$ is determined at a number of points (generally equally spaced) equal to the number of coefficients in its Fourier expansion; (5) the polynominal $P(\theta)/Q(\theta)$ is then evaluated by interpolation; (6) $Q(\theta)$ is then divided into two factors $Q_1(\theta)$ and $Q_2(\theta)$ in such a way that $Q_1(\theta)$ and $P(\theta)/Q_1(\theta)$ shall be roughly of the same order of magnitude in the attenuation band; (7) a network constructed to give two outputs $P(\theta)/Q_1(\theta)$ and its complementary output is then followed in cascade by two networks with characteristics $Q_1(\theta)$, one for each output.

The further compensation of our network for variability of resistances, capacitances, and inductances with frequency, depends on the particular materials at our disposal for construction, and falls outside the content of this invention.

Figure 17:
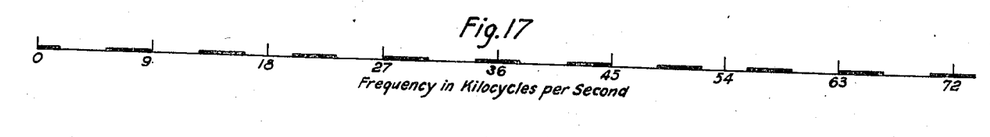
Figures 17 and 18 are illustrative of the transmission characteristics of a system in accordance with the invention.

The two outputs of our first stage of filtering themselves require subsequent filtering to separate their several pass bands. This may be done directly by means of filters of conventional design, or these outputs may be filtered by transmission through one or more networks of construction such as we have described in this invention, before the final separation—if any—is performed by filters of more conventional type. The secondary networks are so designed as to separate alternate bands passed by each output of the first filter. If the arrangement of these bands is as shown in Figure 17, the phase shifting networks of the secondary filter should shift the phase through the angle of those of the main filter. If the arrangement of the pass bands is as shown in Figure 18, the phase shifting networks of the secondary filter should shift the phase through this half angle, plus 180°, the 180° shift to take place between frequency O and the lowest frequency passed. This may be done by combining phase shifting networks exactly similar to those used in a secondary filter of the other type in cascade with a single lattice element, this element consisting of two relatively large inductances in line combined with two relatively large capacities in the diagonal members of the lattice. Figure 19 represents one realization of the elementary phase shifting network, both of the main and of the secondary structure. This we term network "A". Network "B" is one stage of the complete phase shifting structure of the main network, and networks "C" and "D" are respectively single stages of the phase shifting structures of the secondary networks. These are illustrated in Figures 20, 21, and 22.

A single main filter structure will be followed by two secondary filter structures, one of each of the two types mentioned. The device of reducing the stringency of tolerances by realizing a network as a cascade is available for the secondary filters as well as for the primary filters. The design of the characteristics of the secondary filters resembles that of the primary filters, but is simpler in view of the much less stringent requirements, and may be carried out empirically. The use of repeaters to cancel attenuation is permissible in the secondary filters as well as in the primary filter, although the need for these will be somewhat less in view of the smaller length of the cascade in these filters. In this connection, it should be remarked that in our drawings, where a structure is indicated by "repeater", its gain is to be just enough to compensate for parasitic attenuation in the adjoining phase shifting sections.

The tertiary or final filters need only have very low coverage, as the intervals between the frequency bands passed are wide compared with the widths of these bands. They may be of the familiar Campbell type.

Figure 23:
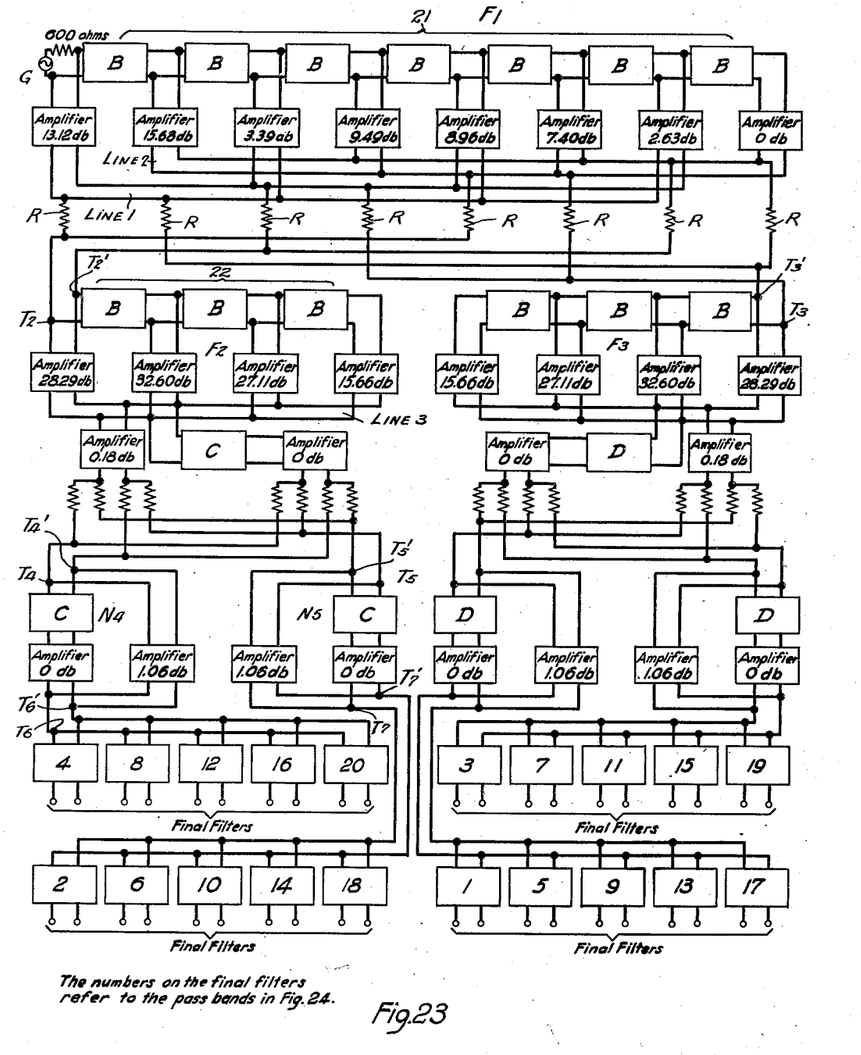
Figure 23 shows schematically a multiplex band selective system in accordance with the invention.
Figure 24:
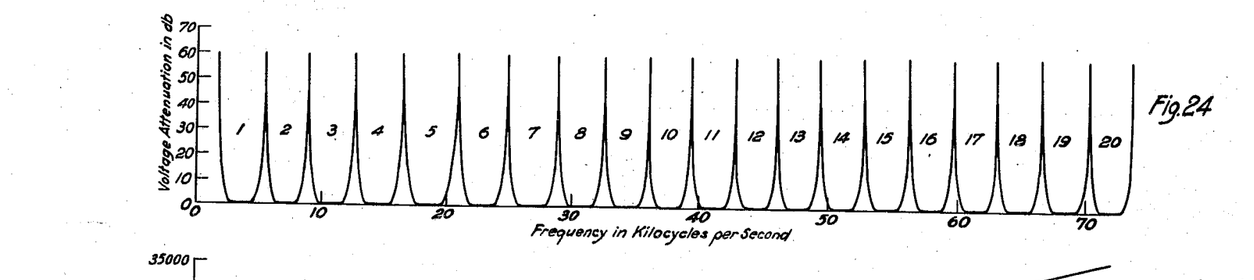
Figures 24, 25, and 26 are illustrative of further typical characteristics of the systems of the invention.

A complete assembly of one realization of our invention is diagrammatically indicated in Figure 23. The relative voltage amplifications of the several amplifiers are indicated. The output attenuations of this filter are given as functions of the frequency in Figure 24.

The system shown in Figure 23 comprises a plurality of cascade connected filters each of similar construction to that shown in Figure 10, and each having two pairs of output terminals to which succeeding filters are attached. The system is designed for the separation of twenty transmission bands spaced at even intervals of 3600 cycles, and for insertion between circuits having impedances of 600 ohms. The first filter, $F_1$, comprises a phase shifting line, 21, made up of seven similar tandem connected sections, labeled B in the drawings, and each being constituted by a plurality of the networks shown in Figure 19 connected in cascade as in Figure 20. The input end of the line is connected to a wave source G of 600 ohms impedance, this matching the characteristic impedance of the line. From the ends of the line and from the intermediate junction points, circuits branch to the inputs of eight amplifiers having preassigned gains as indicated in the drawings. The outputs of one ground of alternate amplifiers are connected in multiple to a common line, designated line 1, and the outputs of the other group are connected to a second common line designated line 2.

Connections are made from these common output lines, to two pairs of output terminals, $T_2$, $T_2'$ and $T_3$, $T_3'$, through a system of eight equal resistances R arranged as shown in Figure 10. By this connection, the component voltages derived from line 21 are impressed in like phase on terminals $T_2$, $T_2'$ and with phases reversed alternately on terminals $T_3$, $T_3'$. As already explained in connection with Figure 9, this results in the realization of different sets of transmission bands at each pair of terminals, the bands of the one set alternating in the frequency scale with the band of the other set and being substantially separated from each other in each output.

To terminals $T_2$, $T_2'$ is connected a second filter $F_2$ which is generally similar to that shown in Figure 16. This filter comprises a phase shifting line 22 having three sections, labeled B, similar to the individual sections of line 21. Four amplifiers having gains respectively as noted in the drawings are connected to the line terminals and junction points and are multiplied to a common line, designated line 3, at their outputs. At this point the filter $F_2$ differs somewhat from that shown in Figure 16. In that figure, as in filter $F_1$, the oscillation voltages derived from the phase shifting line are impressed alternately on two common lines and then transmitted through a system of eight resistances to two pairs of terminals at which the alternate bands appear. In the filter $F_2$ the derived oscillations are transmitted to the pairs of terminals $T_4$, $T_4'$ and $T_5$, $T_5'$ from the single common output of the amplifiers by two paths one of which includes a phase shifting network C of the type shown in Fig. 21. This circuit arrangement and the use of the network C produces the equivalent of the phase reversals obtained by the output connections in the filter $F_1$ and at the same time produces the phase shift made necessary by the particular band allocations resulting from the first selection process. The final output terminals of filter $F_2$ are $T_6$, $T_6'$ and $T_7$, $T_7'$ which are connected to terminals $T_4$, $T_4'$ and $T_5$, $T_5'$ respectively by networks $N_4$ and $N_5$ corresponding to the similarly disposed networks in Figure 16. The phase shifting networks, labeled C, in one branch of each of these networks are also of the type shown in Figure 21.

The separation effected by filters $F_1$ and $F_2$ results in a wide separation of the bands appearing at terminals $T_6$, $T_6'$ and $T_7$, $T_7'$ so that the final separation can be effected by simple filters of the well-known Campbell type. In the particular example illustrated the bands appearing at terminals $T_6$, $T_6'$, in the order of their mid-frequencies, are numbers 4, 8, 12, 16 and 20, and at terminals $T_7$, $T_7'$ the bands are numbers 2, 6, 10, 14 and 18. The spacing of the bands is 14.4 kilocycles so that only very simple filters are required for the final separation. In the drawings the final filters are designated by the even numbers 2 to 20 which also indicate the number of the corresponding transmission band.

For the final separation of the odd numbered bands a second filter $F_3$ is connected to the output terminals $T_3$, $T_3'$ of filter $F_1$ at which these bands appear. This filter and the succeeding final filters are similar to filter $F_2$ and its associated final filters, but in filter $F_3$ the secondary phase shifting networks, labeled D, are of the type shown in Figure 22 instead of the type C shown in Figure 21. This compensates for the specific difference in the frequency allocation of the odd numbered bands from that of the even numbered bands.

The phase characteristics of our outputs need a certain consideration. Except for the final stage of filtering by separate filters, the phase shift generated by the filter is the sum of the total phase shift due to the meshes of the main filter in cascade, plus the phase shift due to the meshes of secondary filters in cascade. A non-linearity in these phase shifts will have two undesirable effects: (1) it will alter the relative width of the different pass bands; (2) it will produce a difference of delay in transmission from one part of one pass band to another. The further effect of producing a different delay in different pass bands is usually innocuous. Effect (1) is nearly proportional to the first derivative of the phase shift with respect to the frequency, and is not very critical, while effect (2) is nearly proportional to the second derivative. In the example of Figure 23, the absolute delay of primary and secondary filters is given as a function of the frequency by the following table:

| f (Kilocycles per second) | 0 | 10 | 20 | 30 | 40 | 50 | 60 | 70 |
|---|---|---|---|---|---|---|---|---|
| Delay (milliseconds) | 3.20 | 2.91 | 2.67 | 2.91 | 3.32 | 3.26 | 3.17 | 3.00 |

Figure 25:
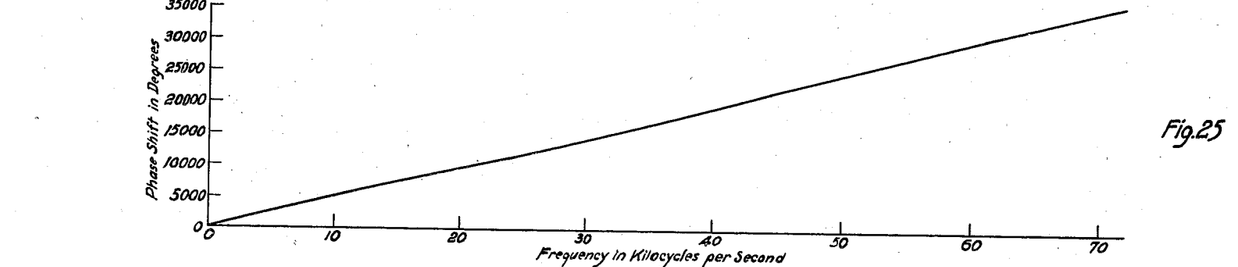
Figure 26:
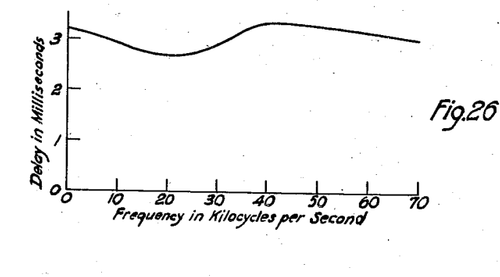

Figures 25 and 26 represent graphically the data here given numerically as to phase shift and delay. If the pass bands do not exceed 3600 cycles in width, the delay will accordingly not vary over any band by more than about .14 millisecond. The width of the different pass bands will not vary by a factor of more than 1.25. The delay characteristic of this filter, crude as the fundamental phase shifting network is, is accordingly quite good.

The reasons for the relatively good phase characteristics of our type of filter are: (1) the fact that the phase shift of a single pass band differs from one margin to the other by only 180°, which is not the case in most forms of wave filter with only a single output; (2) as far as the phase characteristic is concerned, the extreme edges of the pass band do not form a transition band difficult of adjustment, as in other types of wave filter, but are quite as easy to keep linear in phase characteristic as the interior portions. Another way of stating much the same thing is the following: the pooling of the main structure of a large number of distinct filters into a single filter makes it possible for each output to take advantage of the excellent phase characteristic of a single filter containing the totality of parts of all the component filters.

The great advantage of this type of filter over all known types is the fact that the main structure and the secondary structure consist in a repetition of a large number of similar parts, which only depend on the general frequency range to be covered by the filter, while the particular characteristics of the filter are determined merely by the setting of the gains of a number of amplifiers. Our invention is thus available for purposes of mass production, with its consequent economies of labor and materials. It must further be considered that our invention, while using amplifiers as an intrinsic part of a filter, also uses them for their original purpose of amplification, and must be considered, not merely as the equivalent of a bank of filters, but as the equivalent of a bank of filters together with their appurtenant amplifiers.

Figure 27:
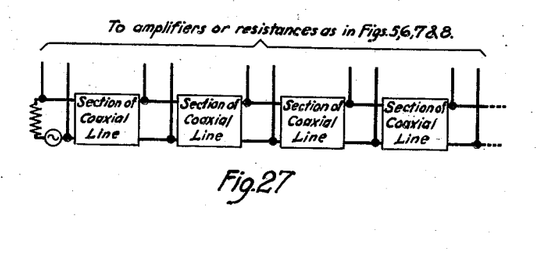
Figure 27 shows the use of coaxial transmission lines as phase shifting devices in the systems of the invention.

While we have described in some detail one embodiment of our invention, its features may be combined in a large number of different ways. It is to be understood that the invention is not limited to the exact details of the structures illustrated and described, as numerous modifications thereof may be made by persons skilled in the art without departing from the spirit and scope of the invention. Among these besides many others are: the replacement of the device of the use of open circuit reflection in a cascade of phase shifting networks by short circuit reflection or other forms of reflection; the substitution of lengths of coaxial line or other forms of line with substantially constant attenuation over a band of frequencies for the phase shifting networks already illustrated (a form of network involving this change is illustrated in Figure 27); the replacement of electrical phase shifting networks by mechanical acoustical or supersonic structures. The types of phase shifting network used and the details of the connection of the several stages of our invention are also subject to large variations without departing from the spirit of the invention.

What is claimed is:

1. An electric wave selecting system comprising a wave transmission line terminated at one end to produce full wave reflection and at the other end to provide zero reflection, said line comprising a plurality of equal sections connected in cascade, a wave source connected to one end of said line, a common output circuit, a plurality of electrical paths connecting said common output circuit and the terminals of said line sections, and amplitude controlling means in each of said paths.

2. An electric wave selecting system comprising a wave transmission line terminated at one end to produce full wave reflection and at the other end in an impedance matching the characteristic impedance of the line, said line comprising a plurality of cascade connected sections having equal phase constants, a wave source connected to one end of said line, a common output circuit, a plurality of separate electrical paths extending between said common output circuit and the terminals of said line sections, and amplitude controlling means in each of said paths.

3. An electric wave selecting system comprising a wave transmission line open-circuited at one end, a wave source of impedance equal to the characteristic impedance of said line connected to the other end thereof, said line comprising a plurality of cascade connected sections having equal phase constants, a common output circuit, a plurality of separate electrical paths interconnecting said output circuit and the junction points of said line sections, said paths presenting high impedances to said line at their junctions therewith, and amplitude adjusting means in each of said paths.

4. A selecting system in accordance with claim 3 in which each of the said sections of said transmission line is an electrical network of lumped inductances and capacities substantially free from resistance, said networks having constant resistance characteristic impedances.

5. A selective system in accordance with claim 3 in which the said amplitude adjusting means comprise space discharge amplifiers.

6. An electric wave selecting network comprising a substantially dissipationless wave transmission line terminated at one end to produce full wave reflection and at the other end to suppress wave reflection, said line comprising a plurality of equal sections connected in cascade, a wave source connected to one end of said line, a pair of output circuits, a plurality of electrical paths connected respectively to said line at the ends thereof and at the junction points of said line sections, amplitude controlling means in each of said paths, means for impressing the outputs of said paths in like phase upon one of said output circuits, and means for impressing the outputs of said paths alternately in reversed phase upon the other of said output circuits.

7. The method of electric wave transmission which comprises reflecting an impressed wave, combining the reflected wave and the impressed wave, deriving from the combined wave a plurality of separate waves of like phase and different amplitudes, and combining the separate derived waves.

8. In a selective transmission system comprising a substantially dissipationless transmission line constituted by a plurality of similar cascade connected sections having equal frequency dependent phase constants, means for producing a transmitted wave and a single reflected wave in said line, means for deriving from the combined transmitted and reflected waves, a plurality of separate oscillations of like phase and having frequency dependent amplitudes proportional to the cosines of $\theta$ and its integral multiples, $\theta$ denoting the phase constant of said line sections, a common output circuit, separate circuits for impressing said derived oscillations on said output circuit, and means in each of said separate circuits for further modifying the oscillation amplitudes in fixed ratios independent of the frequency.

9. A selective transmission system in accordance with claim 8 in which the fixed ratios of amplitude modification in said separate circuits are proportioned to provide substantially zero attenuation between the input of said transmission line and said output circuit for values of $\theta$ in an assigned range between zero and $\pi$ and to make the attenuation large for other values of $\theta$.

10. In a selective system comprising a substantially dissipationless wave transmission line constituted by a plurality of similar cascade connected sections having equal frequency dependent phase constants, the method of selective transmission which comprises producing in said line a transmitted wave and a single reflected wave, deriving from the combined waves oscillations of like phase and having frequency dependent amplitudes proportional to the cosines of $\theta$ and its integral multiples, $\theta$ denoting the phase constant of the said line sections, modifying the amplitudes of said derived waves separately in assigned fixed ratios independent of frequency, and combining the modified derived oscillations.

11. A multiple pass-band wave filter comprising a plurality of similar substantially dissipationless line sections connected in cascade, said sections having equal phase constants which are substantially linear functions of frequency over a wide frequency range, means for impressing a complex wave on said line sections and means producing a single reflected wave corresponding to each component of the complex wave, means for deriving from the combined impressed and reflected waves a plurality of separate oscillations of like phase and having amplitudes proportional to the cosines of $\theta$ and its successive integral multiples, $\theta$ denoting the phase constant of said line sections, a common output circuit, separate circuits for impressing said derived oscillations in like phase on said output circuit, and means in each of said separate circuits for further modifying the oscillation amplitudes independent of frequency in accordance with preassigned fixed ratios whereby repeated transmission bands are provided at frequency intervals corresponding to the period of the variation of $\theta$.

12. A multiple pass-band filter in accordance with claim 11, in combination with a second output phase, and means for impressing the said derived oscillations upon said output circuit alternately in reversed phase whereby a second series of transmission bands is provided at frequencies intermediate the bands appearing in the first-mentioned output circuit.

13. A system for separating a plurality of closely spaced frequency bands comprising a multiple pass-band wave filter having a single input circuit and two output circuits, the transmission between said input circuit and one of said output circuits being characterized by a plurality of transmission bands separated by attenuation bands and the transmission between the input circuit and the other of said output circuits being characterized by a plurality of transmission bands at frequencies within the attenuation bands of the first-mentioned path, and additional multiple pass-band filters connected respectively to receive waves from each of said output circuits, each of said additional filters having two output circuits in which the successive frequency bands impressed on the filter input appear alternatively.

14. The method of separating electric waves in a plurality of closely spaced frequency bands which comprises separating and selectively transmitting the waves in alternate frequency bands as a group and the waves in the other frequency bands as a second group, and repeating the separation of the alternate frequency bands in each group until the number of bands in each group is reduced to unity.

15. An electric wave selecting system comprising in cascade a first component filter selecting several sharply defined frequency bands and a second component filter for selecting one of said bands from the output of said first component filter.

NORBERT WIENER.
YUK-WING LEE.